(12) United States Patent
Choi et al.

(10) Patent No.: US 7,931,979 B2
(45) Date of Patent: Apr. 26, 2011

(54) BATTERY SYSTEM CONTAINING PHASE CHANGE MATERIAL-CONTAINING CAPSULES IN INTERIOR CONFIGURATION THEREOF

(75) Inventors: Seungdon Choi, Daejeon (KR); Hong-Kyu Park, Daejeon (KR)

(73) Assignee: LG Chem, Ltd. (KR)

( * ) Notice: Subject to any disclaimer, the term of this patent is extended or adjusted under 35 U.S.C. 154(b) by 1431 days.

(21) Appl. No.: 11/197,025

(22) Filed: Aug. 4, 2005

(65) Prior Publication Data
US 2006/0063066 A1 Mar. 23, 2006

(30) Foreign Application Priority Data
Aug. 6, 2004 (KR) .................. 10-2004-0062049

(51) Int. Cl.
*H01M 10/50* (2006.01)
*H01M 4/62* (2006.01)
(52) U.S. Cl. .................. 429/120; 429/212; 429/232
(58) Field of Classification Search .............. 429/8, 120, 429/212, 232
See application file for complete search history.

(56) References Cited

U.S. PATENT DOCUMENTS
4,075,400 A * 2/1978 Fritts .......................... 429/62
6,511,517 B1 * 1/2003 Ullrich et al. ............... 29/623.5

FOREIGN PATENT DOCUMENTS
KR 1020040103425 A 12/2004
WO WO 03/061032 A2 7/2003

* cited by examiner

*Primary Examiner* — Tracy Dove
(74) *Attorney, Agent, or Firm* — Cantor Colburn LLP

(57) ABSTRACT

Provided is a battery system in which an interior part of a battery structure includes particles (phase-change particles) containing materials (phase-change materials) having a high latent heat of phase change at a specific temperature, contained in a capsule made of an inert material. The battery system in accordance with the present invention can prolong a service life of the battery by inhibiting temperature elevation inside the battery under normal operating conditions without substantial effects on size, shape and performance of the battery, and further, can inhibit the risk of explosion resulting from a sharp increase in temperature inside the battery under abnormal operating conditions, thereby contributing to battery safety.

12 Claims, 1 Drawing Sheet

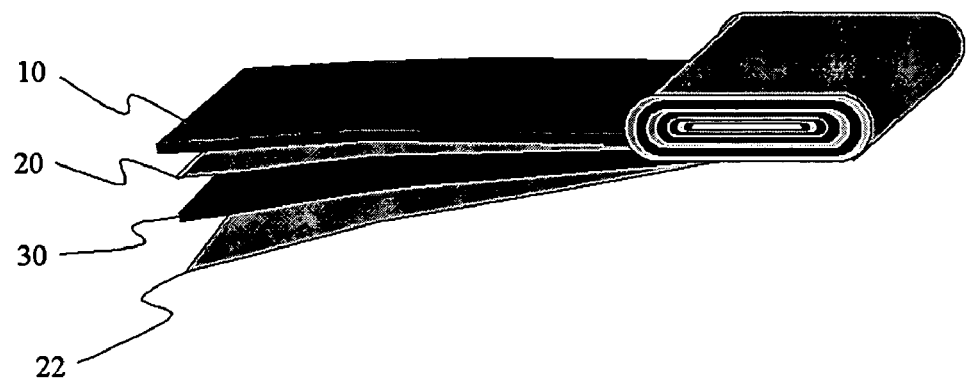
FIG. 2
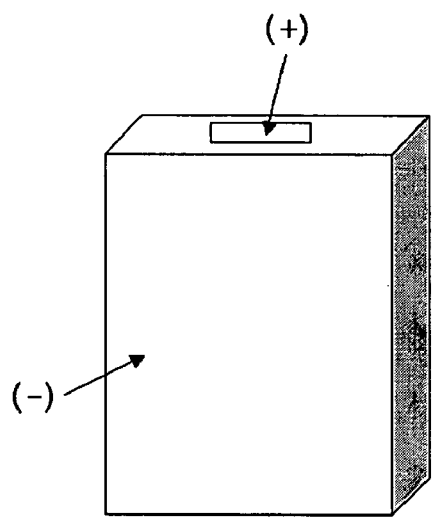
FIG. 3
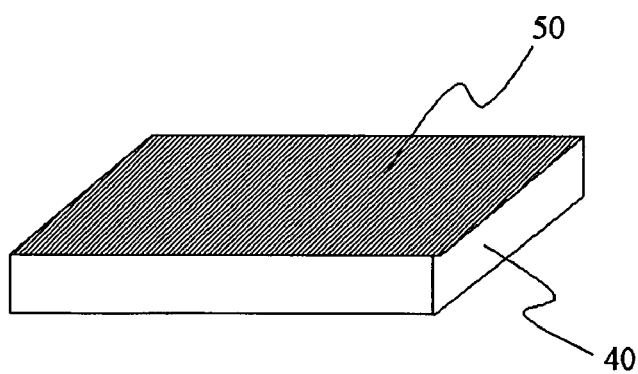

BATTERY SYSTEM CONTAINING PHASE CHANGE MATERIAL-CONTAINING CAPSULES IN INTERIOR CONFIGURATION THEREOF

FIELD OF THE INVENTION

The present invention relates to a battery system including phase change material-containing capsules. More specifically, the present invention relates to a battery system having prolonged service life and improved safety by inhibiting temperature elevation during normal operation of the battery as well as sharp increase of battery temperature due to abnormal operation, via incorporation of a material having high latent heat of phase change (phase change material: PCM) contained in a capsule made of an inert material into internal parts of the battery structure, for example electrode active materials, current collectors, separators, electrolytes, inner or outer surfaces of the battery cases, interior or exterior parts of pouch cases of polymer cells, and outer structures of battery packs.

BACKGROUND OF THE INVENTION

Rapid growth of the portable electronics industry has led to increased demand for batteries, while a rise of internal temperature of the batteries raises a great deal of problems. Typical problems associated with elevation of temperature inside the battery will be reviewed hereinafter.

For example, generation of heat upon charge/discharge of the battery under normal operating conditions leads to operation of the battery at a temperature higher than the outside thereof. Consequently, occurrence of such a high temperature during operation of the battery results in rapid degradation of the battery. Further, rapid elevation in internal temperature of the battery under abnormal operating conditions is a leading cause of battery explosion.

Even though heat generation within a certain limit may be of help to operation of the battery, temperatures outside a specific range and a rapid increase of battery temperature are undesirable in terms of service life and safety of the battery.

As attempts to solve such problems, various methods have been developed which involve incorporation of flame retardants into certain structural elements of the battery, or induces hardening of electrolytes when the battery temperature is higher than a certain temperature, in order to prevent the risk of battery explosion due to sudden increases in temperature of the battery. However, these methods may be employed as measures capable of preventing battery explosion under abnormal operation states, but are not designed to inhibit temperature elevation during normal battery operation. Further, these methods are disadvantageous in that the state of the battery is changed into irreversible state and therefore the battery cannot be used any longer.

As such, there is an urgent need for development of techniques capable of prolonging the service life of the battery by inhibiting temperature elevation inside the battery under normal operating conditions or at least lowering an elevation rate of temperature, and capable of further improving safety of the battery by inhibiting rapid increase of the battery temperature.

Meanwhile, there are known techniques utilizing materials having high latent heat of phase change or phase transfer which are designed for certain applications. For instance, a technique is known which applies high-latent heat materials to garments, furnishings or the like so as to induce gentle temperature changes therein, in spite of rapid temperature changes in the outside, thereby providing more comfortable environment.

In addition, some techniques, in which such high latent heat characteristics are applied to batteries, are also known in the related art. For instance, in order to prevent adverse effects on humans by inhibiting rapid temperature elevation of a battery as a power source in implantable medical devices, International Publication No. WO 03/061032 has proposed a method of installing a battery in a housing including a high-latent heat material, a method in which the high-latent heat material is inserted in the form of heat absorbing mass inside a battery case, and a method in which the battery is assembled by inserting the high-latent heat material between a cathode sheet, an anode sheet and a separator sheet in the form of network-like endothermic mass. However, methods involving inserting the latent heat material, in the form of separate heat absorbing mass or network-like mass, into the interior of the battery case results in disadvantages such as increased size and deteriorated performance of the battery. As a result, there remains a need in the art for development of technology capable of solving such problems associated with battery size and performance together with temperature elevation inside the battery as mentioned above.

SUMMARY OF THE INVENTION

Therefore, the present invention has been made in view of the above problems, and it is an object of the present invention to provide a technique for simultaneously improving service life and safety of the battery by inhibiting temperature elevation therein under normal operation of the battery as well as a sharp increase of temperature under abnormal operation while minimizing adverse effects on battery size and performance.

As a result of extensive and intensive research and various experiments, the present inventors have found that it is possible to efficiently inhibit a temperature elevation during normal or abnormal operation of the battery and thereby to improve service life and safety thereof, when materials undergoing phase change at a specific temperature and having high latent heat of phase change are encapsulated into a capsule made of an inert material and such a particulate capsule is incorporated into the interior of a battery system by addition of the capsule to electrode active materials of the battery or application thereof to an inner or outer surface of the battery case. The present invention has been completed based on this finding.

Therefore, the battery system in accordance with the present invention is configured such that the interior part of the battery structure includes particles in which material having high latent heat of phase change at a specific temperature is contained in a capsule made of an inert material.

The battery system in accordance with the present invention includes various kinds of primary and secondary batteries used in a wide variety of electrical products including notebook computers, electric bicycles and electric vehicles. In addition, such a battery system can be applied to all kinds of batteries, regardless of shapes thereof including cylinder-, square- and pouch-shapes.

As used herein, the term "specific temperature" refers to a temperature that may deteriorate performance and service life of the battery system or threaten safety thereof in repeating state of specific numbers or transient state. The specific temperature may be determined depending upon the battery system. For example, the specific temperature is preferably in the range of 0° C. to 120° C., more preferably 40° C. to 120° C. and particularly preferably 50° C. to 100° C.

Materials having high latent heat of phase change at the specific temperature (hereinafter, referred to as "phase change materials") are those materials that undergoes phase change, preferably from a solid phase to a liquid phase or vice versa, at the specific temperature, and have latent heat greater than heat capacity/unit temperature of elements constituting the battery system. Single compounds, mixtures or complexes of various phase change materials may be employed. Phase change of such materials includes the case in which phase change physically occurs at the specific temperature, as well as the case in which a mixture of two or more materials undergoes phase change via reversible chemical reaction at the specific temperature.

Representative examples of phase change materials include, but are not limited to, paraffin, polyethylene glycol, inorganic hydrates (for example, $Na_2HPO_4.12H_2O$, $Na_2SO_4.10H_2O$ and $Zn(NO_3)_2.6H_2O$). Among these materials, paraffin is particularly preferred as it has relatively high latent heat, is inexpensive and the phase change temperature thereof is easily modified by varying the average molecular weight thereof.

Where the phase change materials are directly added to structural elements of the batteries, for example, where they are added to electrode active materials, those materials undergo a phase change (for example, a change from a solid phase to a liquid phase) at the above-mentioned specific temperature and then escape into electrolytes, thus presenting problems associated with application thereof due to irreversible action mechanisms. In contrast, in accordance with the battery system of the present invention, there is no occurrence of such problems since phase change materials are included in the interior of the battery under the state in which the phase change materials are contained in a capsule made of an inert material.

The phase change material-containing capsule should be non-reactive with structural elements of the battery, and should be made of materials capable of maintaining phase change materials in a sealed state even after phase change of encapsulated phase change materials. Examples of such inert materials include, but are not limited to, acrylic resins, melamine resins, urea resins and mixtures thereof. If necessary, the capsule containing phase change materials may be made of materials enabling decomposition or rupture of the capsule over a critical temperature. The critical temperature may be, for example a temperature which may cause ignition or explosion of the battery. The thickness of the capsule containing phase change materials is not particularly limited so long as it can exert effects in accordance with the present invention. The thickness of the capsule is preferably in the range of 0.01 to 5 μm taking into consideration heat conductivity and morphological stability of the capsule. Where the thickness of the capsule is too thin, it is difficult to stably retain phase-change materials. In contrast, where the thickness of the capsule is excessively thick, it is undesirable in that heat conductivity is lowered and the amount of phase change materials is relatively decreased. In order to enhance heat conductivity of the capsule, materials exhibiting high heat conductivity may be further added to inert materials constituting the capsule, if desired.

As an example, particles in which phase change materials are contained in the capsule of inert material (hereinafter, referred to as phase-change particles) are prepared by coating the outer surface of the particles with conductive materials and then including the coated particles in the interior of the battery system. The conductive materials may be various materials including metals, carbon black and conductive polymers. The outer surface of the phase change particles may be either entirely or partially coated. As examples of the conductive polymers, polypyrrol, polyaniline, polyacetylene or derivatives thereof are preferably employed. As examples of such derivatives, mention may be made of poly(3-butylthiophene-2,5-diyl), poly(3-hexylthiophene-2,5-diyl), poly(3-octylthiophene-2,5-diyl), poly(3-decylthiophene-2,5-diyl) and poly(3-dodecylthiophene-2,5-diyl).

Various techniques for coating certain particles with the conductive materials are known in the art. In addition, preparation of phase-change particles coated with the conductive materials can also be carried out via conventional methods well-known in the art.

Particularly, when added to electrode active materials, the conductive material-coated phase-change particles can also serve as a conductive agent, and thereby provide effects that may replace or reduce the required amount of conductive agents such as carbon black. Where phase-change particles are coated with conductive materials having high heat conductivity such as metals, phase change materials can rapidly respond to changes in the external environment by enhancing heat conductivity of phase-change particles. In addition, when the conductive material-coated phase-change particles are employed for manganese-based active materials, it is possible to prevent high-temperature degradation and high-temperature volume expansion. Further, conductive material-coated phase-change particles are more desirable in batteries in which high-rate characteristics are required.

Preferably, the phase-change particles have a particle diameter of about 0.1 to 1000 μm. From the standpoint of exerting rapid reactivity with respect to changes in temperature, small-diameter phase-change particles having a large surface area per unit weight are preferred. However, if the particle diameter of the corresponding phase-change particles is too small, problems associated with preparation of the phase-change particles and difficulty associated with incorporation of the particles into the interior of the battery may be encountered. Therefore, the particle diameter can be suitably determined within the above-mentioned range.

There is no particular limit to positions that phase-change particles are applied to the interior of the battery system. For example, the positions to which the phase-change particles may be applied include cathode/anode active materials and/or current collectors, separators, electrolytes, inner surfaces and/or outer surfaces of battery cases, interior and/exterior parts of pouch battery cases and outer structures of battery packs. If necessary, two or more structural elements of the battery system or all elements thereof may be selected for application of phase-change particles.

For example, phase-change particles can be used in the form of particles in electrode active materials or separators or electrolytes. In addition, phase-change particles are mixed with suitable solvents to prepare a slurry and then the resulting slurry can be applied in the form of a thin film to the inner surface and/or outer surface of battery cases or outer structures of battery packs, or may be formed into a film which is then attached to the corresponding parts. In addition, upon manufacturing pouch battery cases, phase-change particles can be included in the interior of the battery case by incorporating phase-change particles into battery case materials. When they are included in electrolytes as additives, phase change particles may be preferably prepared to have a small particle diameter to the extent that particles may pass through voids of the separator.

Phase-change particles in accordance with the present invention may be contained in or applied to the separators by which particles are included in the interior of the battery system.

As an example, it is possible to include phase-change particles in the interior of the battery system without lowering battery capacity, by incorporating phase-change particles in the form of powder into a material of the separator at a manufacturing step of the separator of a polymer cell, or by incorporating phase-change particles into a gel polymer coating solution, thereby being coated together with the gel polymer, upon coating a gel polymer on the surface of the separator of the polymer cell. In this connection, Korean Patent Application No. 2004-0038375, assigned to the present applicant, discloses a technique of coating the surface of the separator of the polymer cell with a gel polymer, the disclosure of which is incorporated by reference herein in its entirety.

The content of phase-change particles may be determined depending upon various factors including kinds of phase change materials, a particle diameter of phase-change particles, kinds and shapes of batteries, and application sites of phase-change particles inside the battery system, and thus is not particularly limited. As an example, when phase-change particles are included in electrode active materials as additives, the content of phase-change particles is preferably in the range of 0.1 to 10% by weight so as to exert desired effects of the present invention without inhibiting functions of electrode active materials, based on the total weight of the active materials, but the present invention is not limited thereto.

The processes for preparing phase-change particles are not particularly limited so long as they are techniques for preparing particles having a core/cell structure as in the present invention. For example, phase-change particles can be prepared by dispersing phase change materials in an aqueous phase via emulsification, followed by polymerization on the surface of an oily phase in the resulting dispersion. Polymerization methods that can be used herein include, for example, interfacial polymerization, in-situ polymerization, and coacervation. Thus, encapsulation of phase change materials in accordance with the present invention can be carried out using any method for general microcapsulation.

BRIEF DESCRIPTION OF THE DRAWINGS

The above and other objects, features and other advantages of the present invention will be more clearly understood from the following detailed description taken in conjunction with the accompanying drawings, in which:

FIGS. 1 and 2 schematically show a battery that can be used in the present invention; and FIG. 3 schematically shows a state in which phase-change particles are applied to the surface of a battery case in accordance with one embodiment of the present invention.

DETAILED DESCRIPTION OF PREFERRED EMBODIMENTS

FIGS. 1 and 2 are schematic views of a lithium secondary battery, as a battery system to which phase-change particles in accordance with the present invention can be applied. Referring now to FIGS. 1 and 2, the lithium secondary battery is configured such that a thin film-like cathode and anode 10 and 30 are close to each other in between separators 20 and 22, and are wound to form a stacked electrode assembly mounted inside the battery.

As the battery case, aluminum-laminated sheets and metal cans, which are employed in conventional lithium polymer batteries, can be utilized. These battery case materials can be applied regardless of whether the internal structure of the battery is a stacked or wound type.

Generally, a cathode 10 is prepared by applying a slurry containing a cathode active material, a conductive agent and a binder to a current collector, followed by drying. An anode 30 is prepared by applying a slurry containing an anode active material, a conductive agent and a binder to a thin current collector (such as Cu foil or Ni foil), followed by drying. As the anode active material that can be utilized in the present invention, mention may be made of crystalline carbon-based materials such as natural and artificial graphite having a high degree of graphitization, as well as amorphous carbon or carbon-based materials having a surface treated with amorphous carbon.

As electrolytes of lithium secondary batteries, electrolytes in which lithium salts are dissolved in organic solvents can be used. As the organic solvents, mixed solvents of ethylene carbonate (EC), propylene carbonate (PC), gamma-butyrolactone (GBL), diethylcarbonate (DEC), dimethyl carbonate (DMC) and the like can be employed. As the lithium salts, it is preferred to use $LiClO_4$, $LiAsF_6$, $LiPF_6$, $LiBF_4$, $CF_3SO_3Li$ and the like.

FIG. 3 is a schematic view showing a state in which an application layer 50 of phase-change particles is formed on an inner surface and/or outer surface of a battery case 40 in accordance with one embodiment of the present invention. The application layer 50 of phase-change particles may be formed partially or entirely on either or both of inner and outer surfaces of the battery case 40.

EXAMPLES

Now, the present invention will be described in more detail with reference to the following examples. These examples are provided only for the purpose of illustrating the present invention and should not be construed as limiting the scope and spirit of the present invention.

Example 1

1-1. Preparation of Cathode

93% by weight of $LiCoO_2$ as a cathode active material, 2% by weight of phase-change particles, 2.5% by weight of Super-P (a conductive agent) and 2.5% by weight of PVDF (a binder) were added to NMP (N-methyl-2-pyrrolidone) as a solvent, thereby preparing a cathode mixture slurry, and the resulting slurry was coated on an aluminum current collector to prepare a cathode. The phase-change particles (available from ENET Co., Ltd., Korea) contain encapsulated, saturated paraffinic hydrocarbon having a melting point of 58° C., as a phase change material. Latent heat of the phase-change particles was 145 J/g, based on the dry weight of the microcapsule.

1-2. Preparation of Anode 95.3% by weight of artificial graphite as an anode active material, 0.7% by weight of Super-P (a conductive agent) and 4% by weight of PVDF (a binder) were added to an NMP solvent, thereby preparing an anode mixture slurry, and the resulting slurry was coated on a copper current collector to prepare an anode.

1-3. Preparation of Electrolyte

3% by weight of cyclohexylbenzene (CHB) was added to a solution of 1M $LiPF_6$ in EC/EMC, which was used as an electrolyte, to thereby prepare an electrolyte for a lithium secondary battery.

1-4. Preparation of Battery

The cathode, porous separator and anode, as prepared hereinbefore, were wound into a roll form as shown in FIG. 1, which was then placed in a square-shaped battery case to thereby prepare a battery as shown in FIG. 2. That is, a porous separator 20 having a triple layer structure of PP/PE/PP and a thickness of 20 μm (available from Celgard) is positioned between a cathode 10, prepared by coating a cathode active material on aluminum foil, and an anode 30, prepared by coating an anode active material on copper foil, which was then wound to a roll form and inserted into a cap, thereby preparing a square-shaped battery as shown in FIG. 2.

Example 2

A battery was prepared using the same procedure as in Example 1, except that surfaces of phase-change particles were coated with carbon, and the content of carbon-coated phase-change particles used was 2.1% by weight and the content of Super-P (a conductive agent) was 2.4% by weight. Since the phase-change particles practically used were coated with 5% by weight of carbon, the content of phase-change particles alone was 2% by weight and the total content of conductive agent was 2.5% by weight when a slurry was prepared having the above-mentioned composition. Therefore, conditions for preparing the battery in this example are substantially identical to those of Example 1.

Example 3

A battery was prepared using the same procedure as in Example 1, except that phase-change particles were added to a separator instead of a cathode active material and the content of the cathode active material $LiCoO_2$ was 95% by weight.

Example 4

A pouch-type polymer battery was prepared using the same procedure as in Example 1, except that phase-change particles were incorporated into a gel polymer solution prepared by dispersing 8% by weight of PVDF in acetone and the separator according to Example 1 was then subjected to gel polymer coating using the resulting mixed solution, and the content of the cathode active material $LiCoO_2$ was 95% by weight.

Example 5

A battery was prepared in the same manner as in Example 1, except that phase-change particles were mixed with water instead of addition thereof to a cathode active material, and a water-soluble acrylic binder was added to the resulting mixture to thereby prepare a slurry which was then uniformly applied in the form of a thin film to an inner surface of a square-shaped battery case, and the content of the cathode active material $LiCoO_2$ was 95% by weight.

Comparative Example 1

A battery was prepared using the same procedure as in Example 1, except that phase-change particles were not added to a cathode active material and the content of $LiCoO_2$ was 95% by weight.

Experimental Example 1

For batteries prepared in Example 1 and Comparative Example 1, each battery was charged to 4.2 V with 1 C at a temperature of 60° C. until the current at 4.2 V was 50 mA, and was discharged to 3 V at a rate of 1 C. Such charge/discharge experiments were repeated 100 times and then the capacity rate of the battery relative to the initial capacity rate thereof was confirmed. As a result, the battery of Example 1 exhibited a capacity rate of 89.3% as compared to the initial capacity rate thereof, while the battery of Comparative Example 1 exhibited a capacity rate of 64.5%. Therefore, it was confirmed that the battery system of the present invention can prolong the service life of the battery even when operated under high temperature conditions.

Experimental Example 2

For batteries prepared in Example 2 and Comparative Example 1, each battery was charged to 4.2 V with 1 C at a temperature of 25° C. until the current at 4.2 V was 50 mA, and was then discharged to 3 V at a rate of 0.5 C, 1 C and 2 C, respectively. The capacity rate of the battery relative to 0.5 C discharge capacity was confirmed. As a result, the battery of Comparative Example 1 exhibited the capacity rate of 100%, 98.9% and 95.8%, while the battery of Example 2 exhibited the capacity rate of 100%, 99.0% and 96.2%. Therefore, when phase-change particles having surfaces coated with conductive materials were used, it was confirmed that the rate performance equal to or higher than use of non-coated phase-change particles was achieved even with reduced amounts of the conductive agent.

Experimental Example 3

Using respective batteries prepared in Examples 1 and 2 and Comparative Example 1, safety tests (nail penetration tests after full charge of the battery) were carried out. As a result, ignition and explosion were not observed in batteries of Examples 1 and 2, while ignition and explosion occurred in the battery of Comparative Example 1. Consequently, in the battery system in accordance with the present invention, it was confirmed that rapid increase in battery temperature under abnormal conditions is inhibited by large latent heat produced upon phase-change of phase-change materials contained in an inert capsule, thereby being capable of preventing ignition and explosion of the battery.

In addition, no ignition and explosion were observed in the safety test for batteries of Examples 3 through 5.

INDUSTRIAL APPLICABILITY

As apparent from the foregoing, a battery system including phase-change particles in accordance with the present invention can prolong a service life of the battery by inhibiting temperature elevation inside the battery under normal operating conditions without substantial effects on size, shape and performance of the battery, and further, can inhibit the risk of explosion resulting from a sharp increase of temperature inside the battery under abnormal operating conditions, thereby contributing to battery safety.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A battery system wherein an interior part of a battery structure comprises an inert material capsule containing phase-change particles, the phase-change particles comprising phase-change materials having a high latent heat of phase-change at a specific temperature,
wherein an outer surface of the phase-change particles is coated with a conductive material.

2. The battery system according to claim 1, wherein the battery system is a lithium secondary battery.

3. The battery system according to claim 1, wherein the phase-change material is paraffin.

4. The battery system according to claim 1, wherein the specific temperature is in the range of 0° C. to 120° C.

5. The battery system according to claim 4, wherein the specific temperature is in the range of 40° C. to 120° C.

6. The battery system according to claim 1, wherein the conductive material is a metal, carbon black, or a conductive polymer selected from the group consisting of polypyrrol, polyaniline, polyacetylene and their derivatives.

7. The battery system according to claim 1, wherein the phase-change particles are included in an electrode active material.

8. The battery system according to claim 1, wherein the phase-change particles are included in one or more structural element selected from the group consisting of a current collector, a separator of a battery, an inner surface of a battery case, an outer surface of a battery case, an interior part of a pouch battery case, an exterior part of a pouch battery case and an outer structure of a battery pack.

9. The battery system according to claim 8, wherein, upon coating a gel polymer on the surface of the separator of a polymer cell, the phase-change particles are incorporated into a gel polymer coating solution, thereby being coated together with the gel polymer.

10. The battery system according to claim 8, wherein the phase change particles are mixed with a solvent to prepare a slurry which is then applied or attached, in the form of a film, to at least one of the inner surface of the battery case, the outer surface of the battery case or the outer structure of the battery pack.

11. The battery system according to claim 1, wherein the phase-change particles have a particle diameter of 0.1 to 1000 μm.

12. The battery system according to claim 8, wherein the phase-change particles are incorporated into a material of the separator during manufacture of the separator.

* * * * *